United States Patent
Morgan et al.

(10) Patent No.: US 10,012,091 B2
(45) Date of Patent: Jul. 3, 2018

(54) COOLING STRUCTURE FOR HOT-GAS PATH COMPONENTS WITH METHODS OF FABRICATION

(71) Applicant: General Electric Company, Schenectady, NY (US)

(72) Inventors: Victor John Morgan, Simpsonville, SC (US); George Andrew Gergely, Simpsonville, SC (US); Frederic Woodrow Roberts, Jr., Simpsonville, SC (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/818,695

(22) Filed: Aug. 5, 2015

(65) Prior Publication Data
US 2017/0037731 A1 Feb. 9, 2017

(51) Int. Cl.
| | | |
|---|---|---|
| F01D 5/18 | (2006.01) | |
| F01D 9/06 | (2006.01) | |
| B23P 15/02 | (2006.01) | |

(52) U.S. Cl.
CPC ............ *F01D 5/187* (2013.01); *B23P 15/02* (2013.01); *F01D 9/065* (2013.01); *F05D 2240/81* (2013.01); *F05D 2250/314* (2013.01); *F05D 2250/75* (2013.01); *F05D 2260/2212* (2013.01); *F05D 2260/2214* (2013.01)

(58) Field of Classification Search
CPC .......... F01D 5/187; F01D 9/065; B23P 15/02; F05D 2240/81; F05D 2250/314; F05D 2250/75; F05D 2260/2212; F05D 2260/2214
See application file for complete search history.

(56) References Cited

U.S. PATENT DOCUMENTS

| | | | | |
|---|---|---|---|---|
| 5,370,499 A | * | 12/1994 | Lee .......................... | F01D 5/186 416/97 A |
| 5,690,472 A | * | 11/1997 | Lee .......................... | F01D 5/187 416/95 |
| 6,190,120 B1 | | 2/2001 | Thatcher et al. | |
| 6,402,470 B1 | * | 6/2002 | Kvasnak ................. | F01D 5/187 415/115 |

(Continued)

*Primary Examiner* — Igor Kershteyn
*Assistant Examiner* — Eric Zamora Alvarez
(74) *Attorney, Agent, or Firm* — Ernest G. Cusick; Hoffman Warnick LLC (57) ABSTRACT

Embodiments of the present disclosure provide components for hot gas path (HGP) components and methods of forming the same. A structure according to the present disclosure can include: an HGP component extending radially from a rotor axis of a turbomachine, the HGP component including a tapered edge; a plurality of first passages in fluid communication with a preliminary cooling zone of the HGP component, and extending through a sidewall positioned between the preliminary cooling zone and the tapered edge; and a plurality of second passages extending through at least the tapered edge, wherein each of the plurality of second passages is in fluid communication with the flow path for the operative fluid and at least one passage of the plurality of first passages, and wherein at least one of the plurality of second passages is radially displaced from each passage of the plurality of first passages.

14 Claims, 8 Drawing Sheets

(56) References Cited

U.S. PATENT DOCUMENTS

| | | | |
|---|---|---|---|
| 6,896,487 B2* | 5/2005 | Cunha | F01D 5/186 415/115 |
| 6,902,372 B2* | 6/2005 | Liang | F01D 5/14 415/115 |
| 7,478,994 B2* | 1/2009 | Cunha | F01D 5/18 415/115 |
| 7,670,113 B1 | 3/2010 | Liang | |
| 7,854,591 B2* | 12/2010 | Liang | F01D 5/186 415/115 |
| 8,449,254 B2* | 5/2013 | Devore | B22C 9/04 415/115 |
| 8,894,363 B2* | 11/2014 | Lee | F01D 5/186 415/175 |
| 2005/0265837 A1* | 12/2005 | Liang | F01D 5/186 416/97 R |
| 2012/0070306 A1* | 3/2012 | Lee | F01D 5/187 416/97 R |

* cited by examiner

COOLING STRUCTURE FOR HOT-GAS PATH COMPONENTS WITH METHODS OF FABRICATION

BACKGROUND OF THE INVENTION

The disclosure relates generally to hot gas path (HGP) components, and more particularly, to a cooling structure for an HGP component and methods of fabricating the cooling structure.

In a turbine system, a "hot gas path" (HGP) component can generally include a nozzle, rotor blade, shroud, or other hardware used in a combustion section of a gas turbine. Stationary blades are a type of HGP component used in turbine applications to direct hot gas flows to moving rotor blades, also known as buckets, to generate power. In steam and gas turbine applications, the stationary blades are referred to as nozzles, and are mounted to an exterior structure such as a casing and/or an internal seal structure by endwalls. Each endwall is joined to a corresponding end of an airfoil of the stationary blade. Stationary blades can also include passages or other features for circulating cooling fluids which absorb heat from operative components of the turbomachine. The flow of operative fluids, e.g., hot gas, against the buckets can cause a shaft to rotate and thereby drive a generator operatively connected to the turbine section of the system.

In order to operate in extreme temperature settings, HGP components such as moving and stationary blades need to be cooled. In an example system, cooling fluids can be pulled from the wheel space or a dedicated source and routed into or through a cooling circuit of the blade to provide heat transfer between the composition of the blade and the cooling fluid. In contrast, in many gas turbine applications, later stage nozzles may be fed cooling fluid, e.g., air, extracted from a compressor of the gas turbine. In addition to the effectiveness of cooling, the structure of an HGP and cooling structures therein can affect other factors such as manufacturability, ease of inspection, and the durability of a turbomachine.

BRIEF DESCRIPTION OF THE INVENTION

A first aspect of the present disclosure provides a cooling structure including: a hot gas path (HGP) component configured to be positioned within a flow path of an operative fluid and extending radially from a rotor axis of a turbomachine, the HGP component including a tapered edge; a plurality of first passages in fluid communication with a preliminary cooling zone of the HGP component, and extending through a sidewall positioned between the preliminary cooling zone and the tapered edge; and a plurality of second passages extending through at least the tapered edge, wherein each of the plurality of second passages is in fluid communication with the flow path for the operative fluid and at least one passage of the plurality of first passages, and wherein at least one of the plurality of second passages is radially displaced from each passage of the plurality of first passages.

A second aspect of the present disclosure provides an apparatus including: a hot gas path (HGP) component configured to be positioned within a flow path for an operative fluid and extending radially from a rotor axis of a turbomachine, the HGP component including a tapered edge; an endwall coupled to a radially outer end of the HGP component relative to the rotor axis of the turbomachine; a plurality of first passages in fluid communication with a preliminary cooling zone and extending through a sidewall positioned between the preliminary cooling zone and the tapered edge of the HGP component, wherein the preliminary cooling zone is in fluid communication with a chamber positioned within the endwall; and a plurality of second passages extending through at least the tapered edge of the HGP component, wherein each of the plurality of second passages is in fluid communication with the flow path for the operative fluid and at least one passage of the plurality of first passages, and wherein at least one of the plurality of second passages is radially displaced from each passage of the plurality of first passages.

A third aspect of the present disclosure provides a method of fabricating a cooling structure. The method can include: sealing at least one cooling fluid hole positioned on a tapered edge surface of a hot gas path (HGP) component to form a barrier, the at least one cooling fluid hole being in fluid communication with a first passage to a preliminary cooling zone within the HGP component, the preliminary cooling zone being positioned proximal to the tapered edge of the HGP component; and forming a second passage within the tapered edge surface of the HGP component, wherein the formed second passage is in fluid communication with the first passage, to form a cooling structure including the first passage and the second passage fluidly connecting the preliminary cooling zone of the HGP component to a flow path for an operative fluid external to the HGP component, wherein the first passage is oriented in a substantially non-coaxial direction relative to the first passage.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Embodiments of the present disclosure provide a cooling structure for a HGP component, in addition to methods of fabricating the cooling structure. A cooling structure according to the present disclosure can include a hot gas path (HGP) component which is configured to be positioned within a flow path of an operative fluid (e.g., hot gas) and which extends radially from a rotor axis of a turbomachine. The airfoil can make up part of, e.g., a stationary blade or a rotatable turbine bucket. The airfoil can include a preliminary cooling zone positioned within a core passage of the airfoil and proximal to a tapered edge of the airfoil. A plurality of first passages can be in fluid communication with the preliminary cooling zone, extending through a sidewall. Each first passage can be positioned between the core passage and the tapered edge of the HGP component. The airfoil can also include a plurality of second passages extending through the tapered edge of the airfoil and in fluid communication with the flow path for the operative fluid. The plurality of first passages and the plurality of second passages can meet at junctions within the structure of the airfoil, between the stationary blade and core passage, such that each first passage is in fluid communication with at least one corresponding second passage. In addition, at least one second passage can be radially displaced from at least one fluidly connected first passage, such that heat transfer from contact between cooling fluid and the airfoil increases within the junction between one or more first passages and second passages.

Spatially relative terms, such as "inner," "outer," "beneath," "below," "lower," "above," "upper," "inlet," "outlet," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
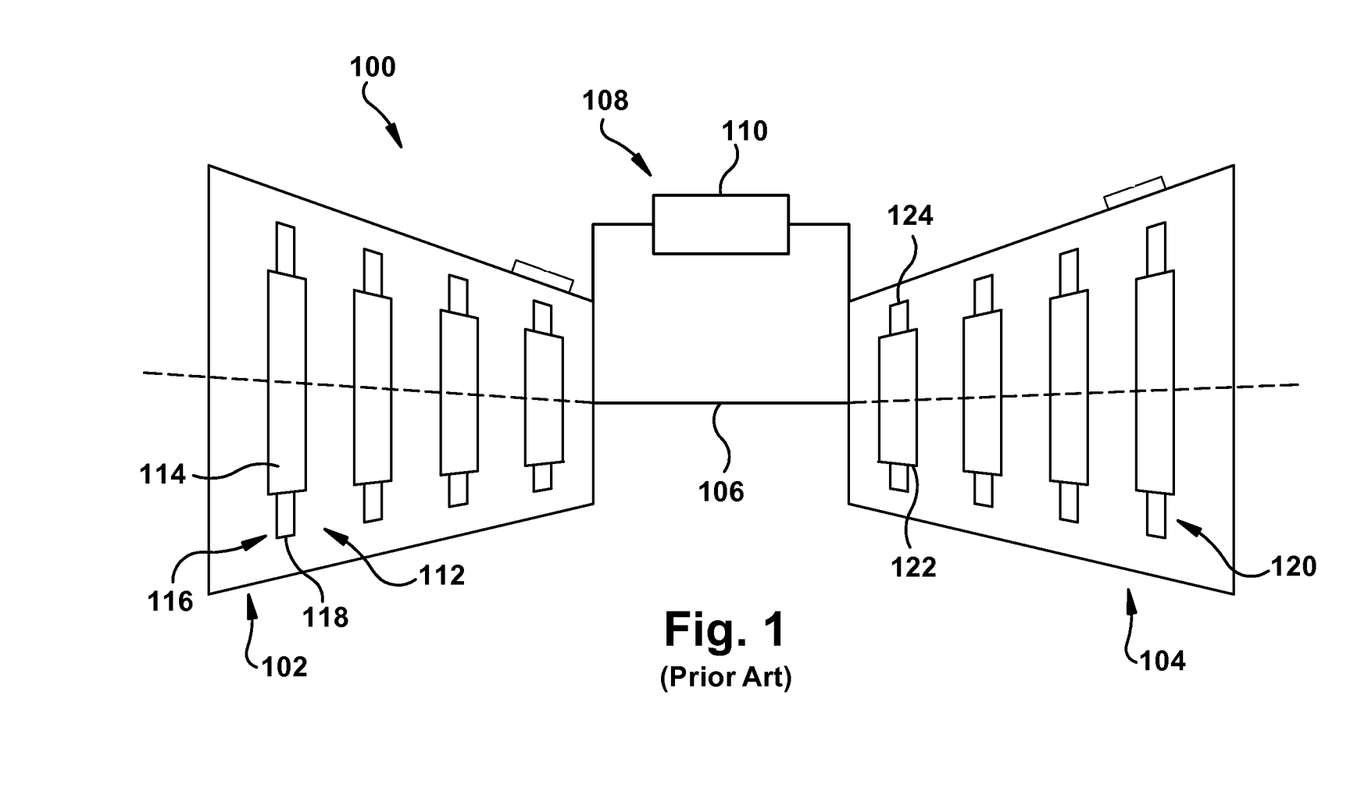
FIG. 1 shows a schematic view of a conventional turbomachine.

Embodiments of the disclosure provide a cooling structure for a HGP component of a turbomachine. FIG. 1 shows a conventional turbomachine 100 that includes a compressor portion 102 operatively coupled to a turbine portion 104 through a common compressor/turbine shaft 106. Compressor portion 102 is also fluidly connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. In accordance with an exemplary embodiment, a cooling structure according to embodiments of the present disclosure can provide cooling to a tapered edge of an HGP component such as rotor blade/and or other portions of the HGP component connected to the same cooling circuit. It will be understood, however, that embodiments of the cooling structures described herein may be positioned in other components or areas of turbomachine 100.

Figure 2:
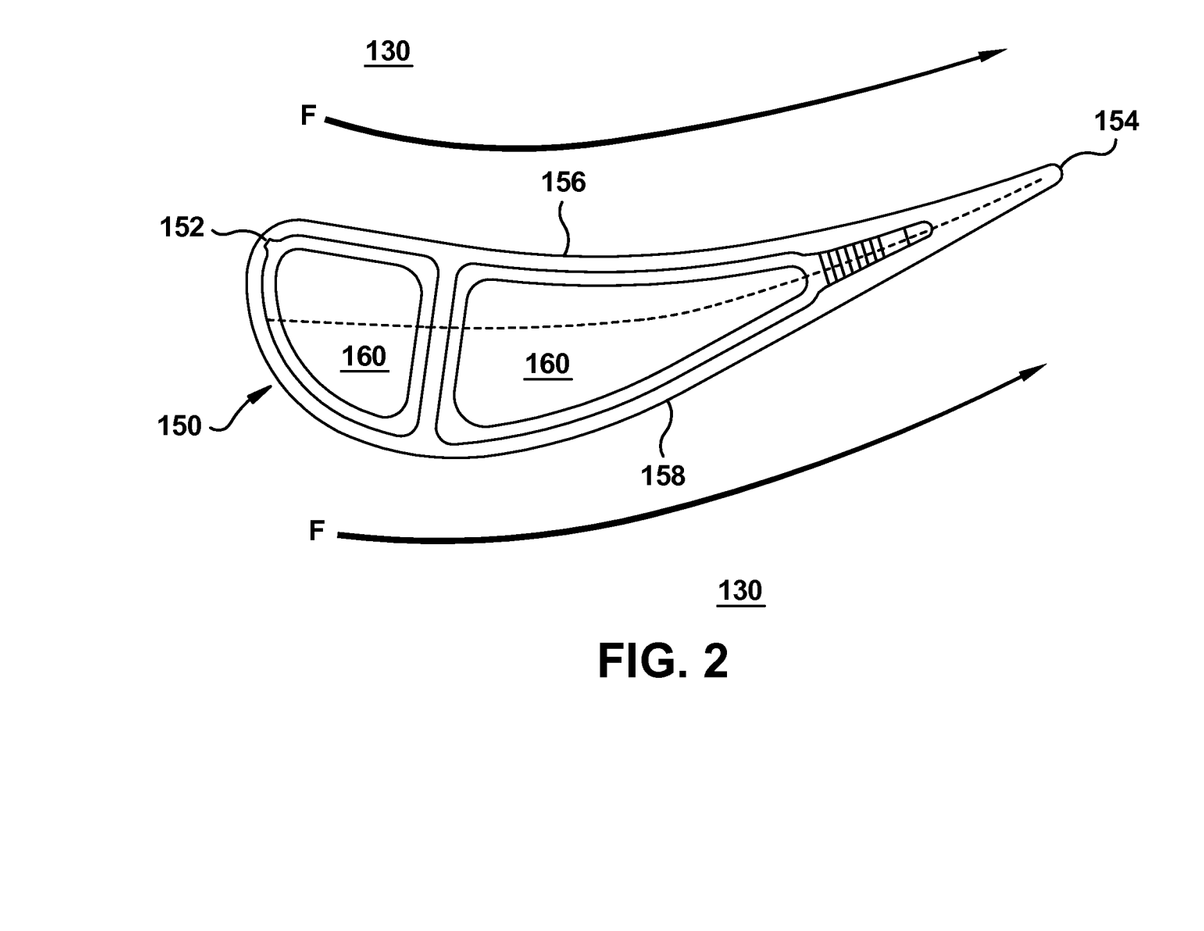
FIG. 2 is a cross-sectional view of an airfoil positioned within a flow path of operative fluid according to embodiments of the present disclosure.

Turning to FIG. 2, a cross-section of an HGP component in the form of an airfoil 150 having a flow path 130 for operating fluids therein is shown. Although airfoil 150 is provided herein as an example HGP component, it is understood that embodiments of the present disclosure can be applied to other HGP components, e.g., shrouds, nozzles, rotor blades, and/or other hardware of turbomachine 100 positioned within a flow path for operative fluid. Airfoil 150 discussed herein can be part of any currently known or later developed form of HGP component including, e.g., turbine rotor blade(s) 124 and/or stationary blades 200 (FIG. 3), and can further include the components and/or points of reference described herein.

Airfoil 150 can be positioned within a flow path for an operative fluid. Fluids can flow across airfoil 150, e.g., along path(s) F, while traveling from one turbine rotor blade 124 or stationary blade 200 (FIG. 3) to another. A broad edge 152 of airfoil 150 can be positioned at an initial point of contact between operative fluid in flow path 130 and airfoil 150. A tapered edge 154, by contrast, can be positioned at the opposing side of airfoil 150. In addition, airfoil 150 can include a pressure side surface 156 and/or suction side surface 158 distinguished by a transverse line which substantially bisects broad edge 152 and extends to the apex of tapered edge 154. Pressure side surface 156 and suction side surface 158 can also be distinguished from each other based on whether fluids in flow path 130 exert positive or negative resultant pressures against airfoil 150.

Airfoil 150 can also include one or more cooling fluid passages 160 in fluid communication with one or more preliminary cooling zones, e.g., pin banks, impingement cooling circuits, cooling air cavities, etc., positioned proximal to tapered edge 154, as discussed elsewhere herein. In an embodiment where airfoil 150 is part of stationary blade 200, cooling fluid passages 160 can be provided in the form of impingement sleeves. In the case of turbine rotor blade(s) 124, cooling fluid passages 160 of airfoil 150 can be in the form of serpentine cooling passages. The locations on airfoil 150 and types of preliminary cooling zones identified in FIG. 2 and discussed herein are provided as examples and not intended to limit possible locations and/or geometries for airfoils 150 according to embodiments of the present disclosure. The placement, arrangement, and orientation of various sub-components can change based on intended use and the type of power generation system in which cooling structures according to the present disclosure are used. The shape, curvatures, lengths, and/or other geometrical features of airfoil 150 can also vary based on the application of a particular turbomachine 100 (FIG. 1). Airfoil 150 can be positioned between successive turbine rotor blades 124 (FIG. 1), stationary blades 200 or other components of a power generation system such as turbomachine 100.

Figure 3:
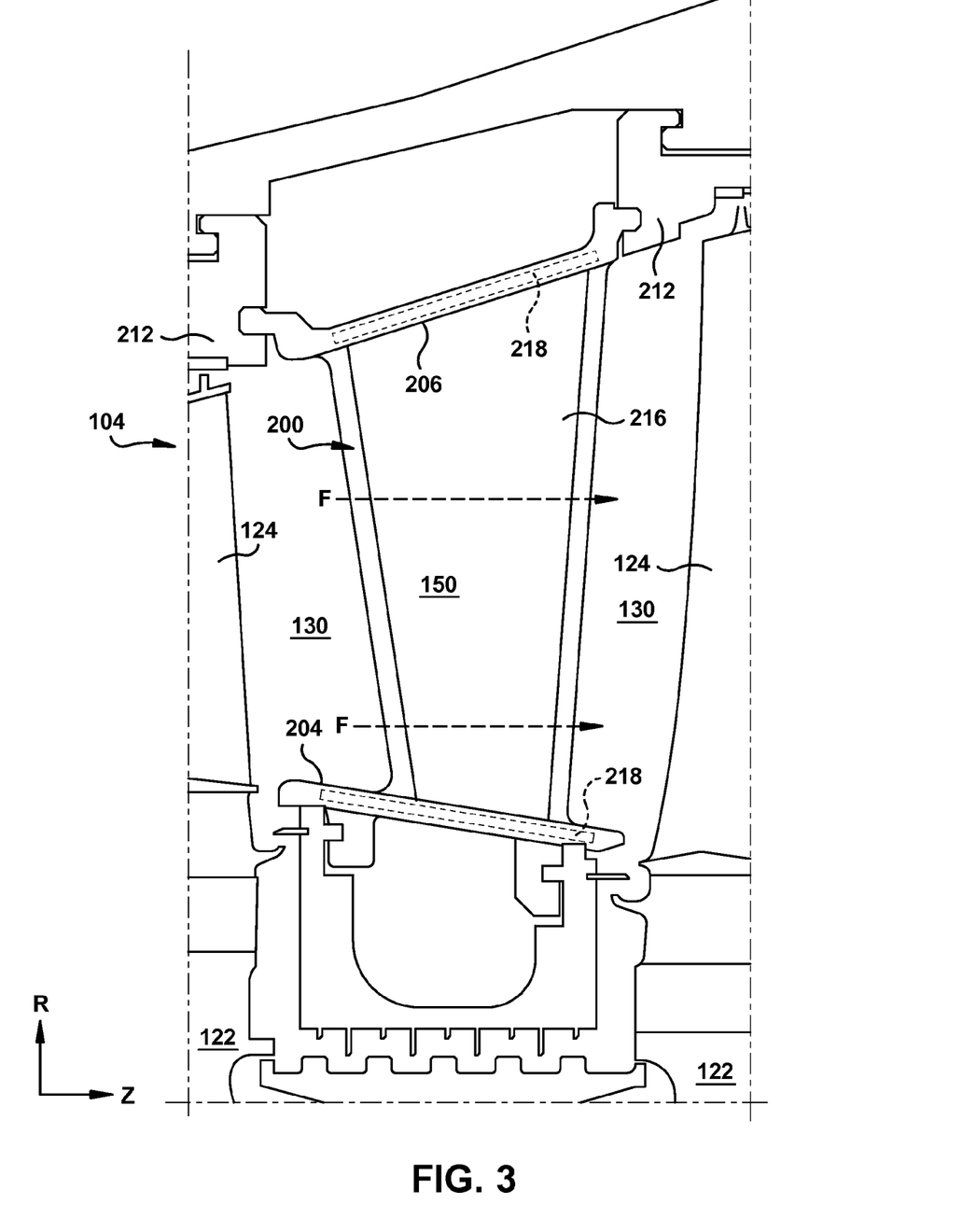
FIG. 3 is a cross-sectional view of a stationary blade between two rotor blades in a turbine section of a turbomachine.

Turning to FIG. 3, a cross section of flow path 130 within turbine portion 104 is shown. An operative fluid (e.g., hot combustion gasses, steam, etc.) can flow (e.g., along flow lines F) through flow path 130, where it can flow to further turbine rotor blades 124 as directed by the position and contours of stationary blade 200. Turbine portion 104 is shown extending along a rotor axis Z of turbine wheel 122 (e.g., coaxial with shaft 106 (FIG. 1)), and with a radial axis R extending outwardly and perpendicularly therefrom. Stationary blade 200 can include airfoil 150 oriented substantially along (i.e., extending in a direction parallel with) radial axis R. Although one stationary blade 200 is shown in the cross-sectional view of FIG. 2, it is understood that multiple turbine rotor blades 124 and stationary blades 200 can extend radially from turbine wheel 122, e.g., extending laterally into and/or out of the plane of the page. An airfoil 150 of stationary blade 200 can include an inner endwall 204 coupled to an inner radial end of airfoil 150, and an outer endwall 206 coupled to an outer, opposing radial end of airfoil 150. Embodiments of the present disclosure can provide a cooling structure for turbine rotor blades 124, stationary blades 200, and/or other types of blades which include airfoil(s) 150 as part of their structure.

Inner endwall 204 can be positioned adjacent to turbine wheel 122, while outer endwall 206 can be positioned adjacent to a turbine shroud 212. During operation, the hot combustion gases travelling along flow lines F can transfer heat to airfoil 150 and endwall(s) 204, 206 e.g., by operative fluids contacting airfoil 150 and endwall(s) 204, 206 of stationary blade 200. In some circumstances, airfoil 150 of stationary blade 200 may include an interior cooling circuit (not shown) therein. Specifically, some types of airfoils 150 can include an interior cavity or other cooling circuit for transmitting cooling fluids radially through airfoil 150. In these types of systems, cooling fluids within airfoil 150 can absorb heat from the operative fluid in flow path 130 via the thermally conductive material composition of airfoil 150. However, in other embodiments (e.g., first stage singlet turbine nozzles), the cross-section of airfoil 150 may not include any interior cooling circuits therein. For stationary blades 200 without cooling circuits within airfoil 150, cooling can instead be provided with cooling circuits within inner and outer endwalls, 204, 206, without impingement cooling circuits within airfoil 150 and/or fluid communication between cooling circuits in airfoil 150 and endwalls 204, 206. Each endwall 204, 206 can include a chamber 218 therein for circulating cooling fluid(s) within stationary blade 200. The cooling fluids within chamber 218 of inner endwall 204 or outer endwall 206 can absorb heat from operating fluids in flow path 130 through the thermally conductive material composition of each endwall 204, 206 and airfoil 150. In embodiments of the present disclosure, heat transferred to airfoil 150 from operative fluids in flow path 130 can be transmitted to chamber(s) 218 of inner and outer endwalls 204, 206 through the material composition of stationary blade 200. Stationary blade 200, including airfoil 150 and endwalls 204, 206, can therefore be composed of thermally conductive metals such as industrial steels, superalloys, etc.

Airfoil 150 of turbine rotor blade 124 or stationary blade 200 can include a preliminary cooling zone 216, e.g., a pin bank, therein. Preliminary cooling zone 216, which can be provided as a partially or completely hollow core passage of airfoil 150, can circulate a cooling fluid between inlets and exits for cooling fluid connecting the exterior of airfoil 150 to a different cooling circuit of airfoil 150. In the example of stationary blade 200, preliminary cooling zone 216 can circulate cooling fluids from an impingement cooling circuit between two radially opposed endwalls 204, 206 to the exterior of airfoil 150. An impingement cooling circuit generally refers to a cooling circuit structured to create a film of cooling fluid about a portion of a cooled component (e.g., a transverse radial member of airfoil 150), thereby diminishing the transfer of thermal energy from substances outside the cooled component to an interior volume of the cooled component. In the example of stationary blade 200, cooling fluids in preliminary cooling zone 216 can originate from and/or flow to a chamber 218 positioned within one endwall 204 or two radially separated endwalls 204, 206 through an impingement sleeve therebetween. Cooling fluids in chamber(s) 218 which have not traveled through an impingement sleeve can be known as "pre-impingement" cooling fluids, while cooling fluids in chamber(s) 218 which have previously traveled through an impingement sleeve can be known as "post-impingement" cooling fluids. In the case of turbine rotor blade 124, preliminary cooling zone 216 can be in fluid communication with a serpentine cooling circuit (not shown) positioned within turbine rotor blade 124.

Figure 4:
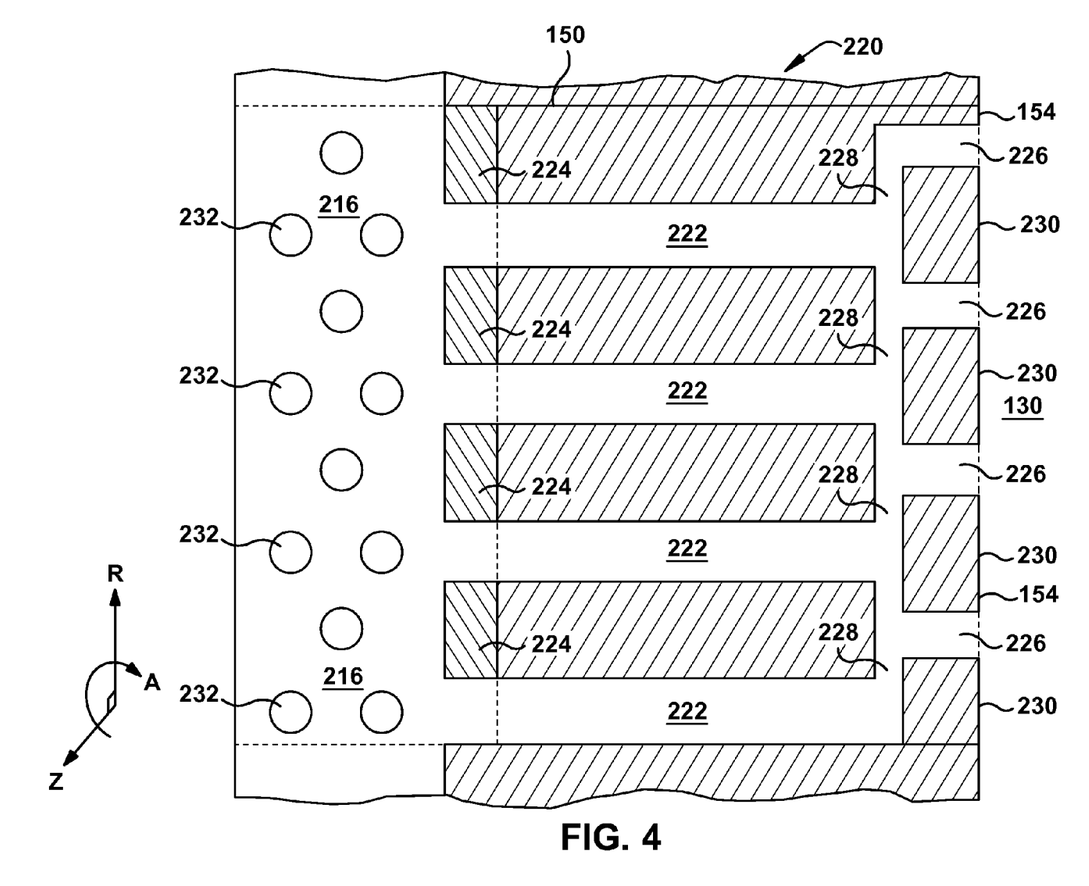
FIG. 4 is a cross-sectional view of a cooling structure according to embodiments of the present disclosure.

Turning to FIG. 4, a horizontal cross-sectional partial view of a cooling structure 220 in airfoil 150 (representing a portion of, e.g., stationary blade 200 (FIG. 3) or turbine rotor blade 124 (FIG. 3)) according to embodiments of the present disclosure is shown. Airfoil 150 is depicted along radial axis "R extending from an origin located, e.g., at a rotor axis of turbomachine 100 (FIG. 1). Rotor axis "Z" is shown to extend out of the plane of the page, with a circumferential axis "A" oriented circularly about rotor axis Z and passing through radial axis R. Cooling structure 220 can be provided as a component of airfoil 150, e.g., as an integral structure or group of sub-structures formed within the material composition of airfoil 150. Cooling structure 220, as discussed herein, can include preliminary cooling zone 216 and/or be fluidly connected to preliminary cooling zone 216 as a separate article or region. One circumferential end of cooling structure 220 is shown to be substantially coplanar with tapered edge 154 of airfoil 150 and adjacent to flow path 130. Another circumferential end of cooling structure 220 is shown to be adjacent to preliminary cooling zone 216.

Preliminary cooling zone 216 can extend substantially along radial axis R through airfoil 150. Preliminary cooling zone 216 can be proximal to tapered edge 154 of airfoil 150, with flow path 130 for operative fluid being circumferentially adjacent and external to both airfoil 150 and cooling structure 220. As used herein, two or more elements being positioned "proximal" to each other can refer to any arrangement by which the two or more elements are separated by only one intervening structural element regardless of any sub-elements or differing materials therein. For example, preliminary cooling zone 216 being proximal to tapered edge 154 of airfoil 150 can include an arrangement by which only the material composition of airfoil 150 (i.e., an intervening structural element), including any passages (i.e., sub-elements) or changes in material composition therein, separates preliminary cooling zone 216 from tapered edge 154 of airfoil 150. Cooling structure 220 can also include a plurality of first passages 222 in fluid communication with preliminary cooling zone 216 and extending through a sidewall 224 of preliminary cooling zone 216. Each first passage 222 can be positioned substantially circumferentially, i.e., along circumferential axis "A," between preliminary cooling zone 216 and tapered edge 154 of airfoil 150. Cooling structure 220 can thereby take the form of a manifold or plenum for transmitting cooling fluid(s) from preliminary cooling zone 216 to flow path 130.

Each first passage 222 can be in fluid communication with preliminary cooling zone 216 and a plurality of second passages 226 extending through tapered edge 154 of airfoil 150. Second passages 226 can fluidly connect preliminary cooling zone 216 and first passages 222 to flow path 130 for operative fluid. In an embodiment, first and second passages 222, 226 can be radially separated from each other along radial axis R, in addition to being substantially perpendicular with radial axis R and extending substantially in parallel with circumferential axis A. However, it is understood that second passage(s) 226 can have different angular orientations with respect to first passage(s) 222, circumferential axis A, and/or radial axis R. For example, at least one second passage 226 can be oriented substantially at non-parallel angle relative to circumferential axis A of turbomachine 100 (FIG. 1). Each second passage 226 can be in fluid communication with and positioned radially distal to at least one corresponding first passage(s) 222. In an embodiment, each second passage 226 can be in fluid communication with two or more first passages 222, thereby transmitting cooling fluid from multiple first passages 222 to flow path 130. In addition or alternatively, at least two second passages 226 of cooling structure 220 can be in fluid communication with a shared first passage 222, to provide a branching path for cooling fluids to flow from preliminary cooling zone 216 to flow path 130.

During operation, cooling fluids can flow to first passage(s) 222 from preliminary cooling zone 216 and partially radially through a junction passage 228 positioned between first and second passages 222, 226 to reach flow path 130, e.g., by action of positive pressure. Positive pressure generally refers to a configuration in which fluids are propelled through an environment from regions of higher pressure (such as preliminary cooling zone 216) to regions of lower pressure (such as flow path 130) by maintaining the environment with different values and pressure and a corresponding pressure differential between two or more regions or components. In other embodiments, cooling structure 220 can include at least partially radially oriented region(s) of first passage 222 or second passage 226 to form a junction between first and second passages 222, 226 without separate junction passage(s) 228. During operation, the radial displacement between first and second passages 222, 226 can cause cooling fluids to contact the structure of airfoil 150 within junction passage 228 between first and second passages 222, 226. The flow of cooling fluids radially from first passages 222 to second passages 226 during operation can disrupt an otherwise substantially circumferential flow of the cooling fluid to flow path 130. The disruption of cooling fluid flow and increased turbulence between first and second passages 222, 226 can increase the amount of contact area between cooling fluids in cooling structure 220 and portions of airfoil 150 located proximal to tapered edge 154 during operation, thereby improving heat transfer.

A barrier 230 can be positioned at a circumferential end of one or more first passages 222, thereby fluidly separating first passage(s) 222 from flow path 130 for operative fluid. Each barrier 230 can be structurally integral with airfoil 150 and thus be composed of at least substantially the same material(s) as are provided to form airfoil 150. Alternatively, barrier(s) 230 can be composed of a different material from airfoil 150, but can be provided as an integral structural component of airfoil 150. To bypass barrier(s) 230, cooling fluids in first passage(s) 222 can flow radially through junction passage(s) 228 before continuing to flow substantially circumferentially through second passage(s) 226 to reach flow path 130. Each barrier 230 can be positioned proximal to tapered edge 154 and can form part of the structural composition of tapered edge 154 and airfoil 150. In any event, barriers 230 can be composed of a thermally conductive material for transferring heat from operative fluids in flow path 130 to cooling fluids in junction passage(s) 228 and second passage(s) 226. For instance, barrier(s) 230 can be composed of substantially the same material or group of materials as airfoil 150. During operation, a heat transfer coefficient between cooling fluids cooling structure 220 and barrier 230 can be greater than a heat transfer coefficient between cooling fluids in cooling structure 220 within preliminary cooling zone 216 and the structure of airfoil 150.

Cooling structure 220 can also include one or more thermally conductive fixtures ("fixtures") 232, within preliminary cooling zone 216 for transferring heat from stationary blade 200 to cooling fluids within preliminary cooling zone 216. More specifically, each fixture 232 can transmit heat absorbed by the composition of airfoil 150 to cooling fluids therein by increasing the contact area between cooling fluids passing through preliminary cooling zone 216 and the material composition of airfoil 150. Fixtures 232 can be provided as any conceivable fixture for increasing the contact area between cooling fluids and thermally conductive surfaces of preliminary cooling zone 216, and as examples can be in the form of pedestals, dimples, protrusions, pins, walls, and/or other fixtures of other shapes and sizes. Furthermore, fixtures 232 can take a variety of shapes, including those with cylindrical geometries, substantially pyramidal geometries, irregular geometries with four or more surfaces, etc. In any event, one or more fixtures 232 can be positioned within preliminary cooling zone, within the confines of sidewall(s) 224. Fixtures 232 can also be present within or absent from first and second passages 222, 226.

Figure 5:
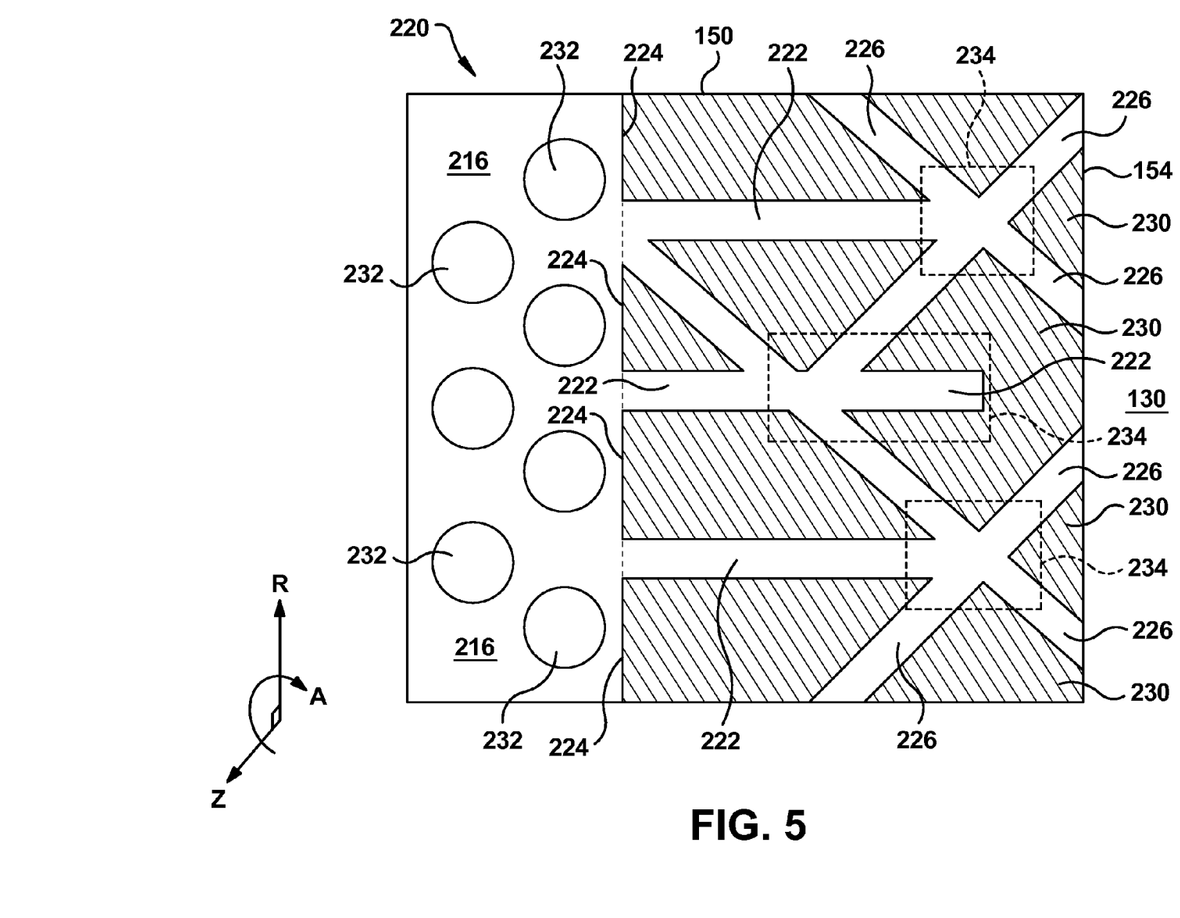
FIG. 5 is a cross-sectional view of an alternative cooling structure formed through a method according to embodiments of the present disclosure.

Turning to FIG. 5, an alternative embodiment of cooling structure 220 according to embodiments of the present disclosure is shown. The embodiment of cooling structure 220 shown in FIG. 5 can be formed according to methods discussed in detail elsewhere herein. Preliminary cooling zone 216 can include thermally conductive fixtures 232 therein, with first passages 222 in fluid communication with preliminary cooling zone 216. Each first passage can extend through a corresponding sidewall 224 preliminary cooling zone 216 substantially circumferentially toward tapered edge 154. A group of barriers 230, positioned circumferentially between first passages 222 and flow path 130, can obstruct direct circumferential flow of cooling fluids from first passages 222 into flow path 130. In some embodiments, as is shown by example in FIG. 5, second passage(s) 226 can intersect with first passage 222 upstream of barrier 230, with first passage 222 including a circumferential terminus at barrier 230. In addition, one or more second passages 226 can include a first end and/or second end radially displaced from one or more first passages 222. Each second passage 226 can at least be in fluid communication with flow path 130 and one or more first passages 222. In addition, each second passage 226 can also be in direct fluid communication with preliminary cooling zone 216. One or more first passages in addition or alternatively may extend along circumferential axis A, to reach barrier 230 and/or flow path 130. First and second passages 222, 226 can optionally intersect with each other at junctions 234, without associated junction passages 228 (FIG. 4). Junctions 234 generally can be defined as any intersection where one or more second passages 226 meet non-coaxially and join with one or more first passages 222. In an example embodiment, second passages 226 can oriented along an angle of, e.g., approximately forty-five degrees or one-hundred and thirty-five degrees relative to circumferential axis A and/or the orientation of first passage(s) 222.

Figure 6:
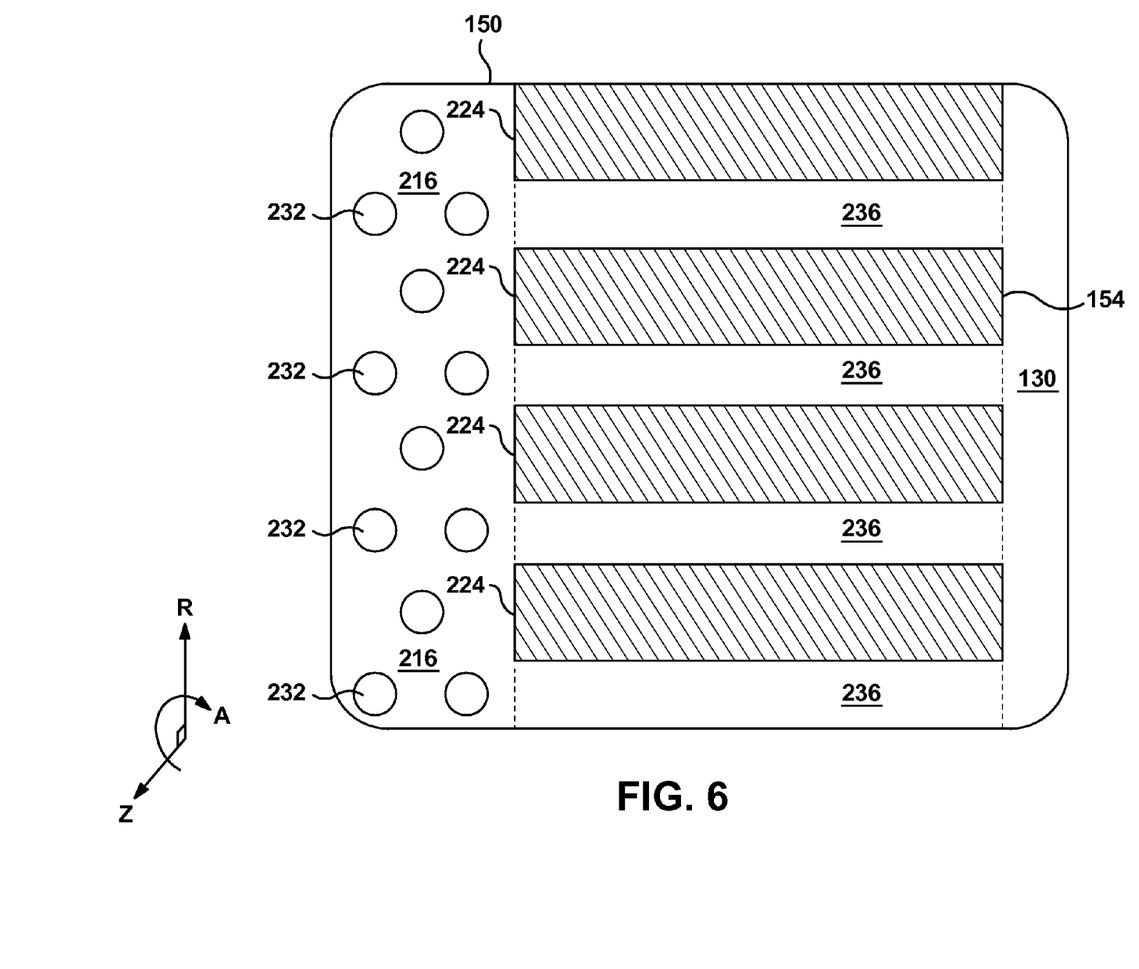
FIG. 6 is a cross-sectional view of an initial HGP component according to embodiments of the present disclosure.

Turning to FIG. 6, Embodiments of the present disclosure also provide methods of fabricating a cooling structure (e.g., cooling structure 220 (FIGS. 4, 5) for an HGP component. Initially, airfoil 150 of an HGP component such as turbine rotor blade 124 (FIGS. 1, 3) and/or stationary blade 200 (FIG. 3) can include preliminary cooling zone 216 with cooling fluid holes 236 fluidly connecting preliminary cooling zone 216 to flow path 130. Each cooling fluid hole 236 can be extend through a surface of tapered edge 154 of airfoil 150. The flow of cooling fluid through cooling fluid holes 236 can initially be free of barrier(s) 230 (FIGS. 4, 5) and/or second passage(s) 226 (FIGS. 4, 5) therein.

Figure 7:
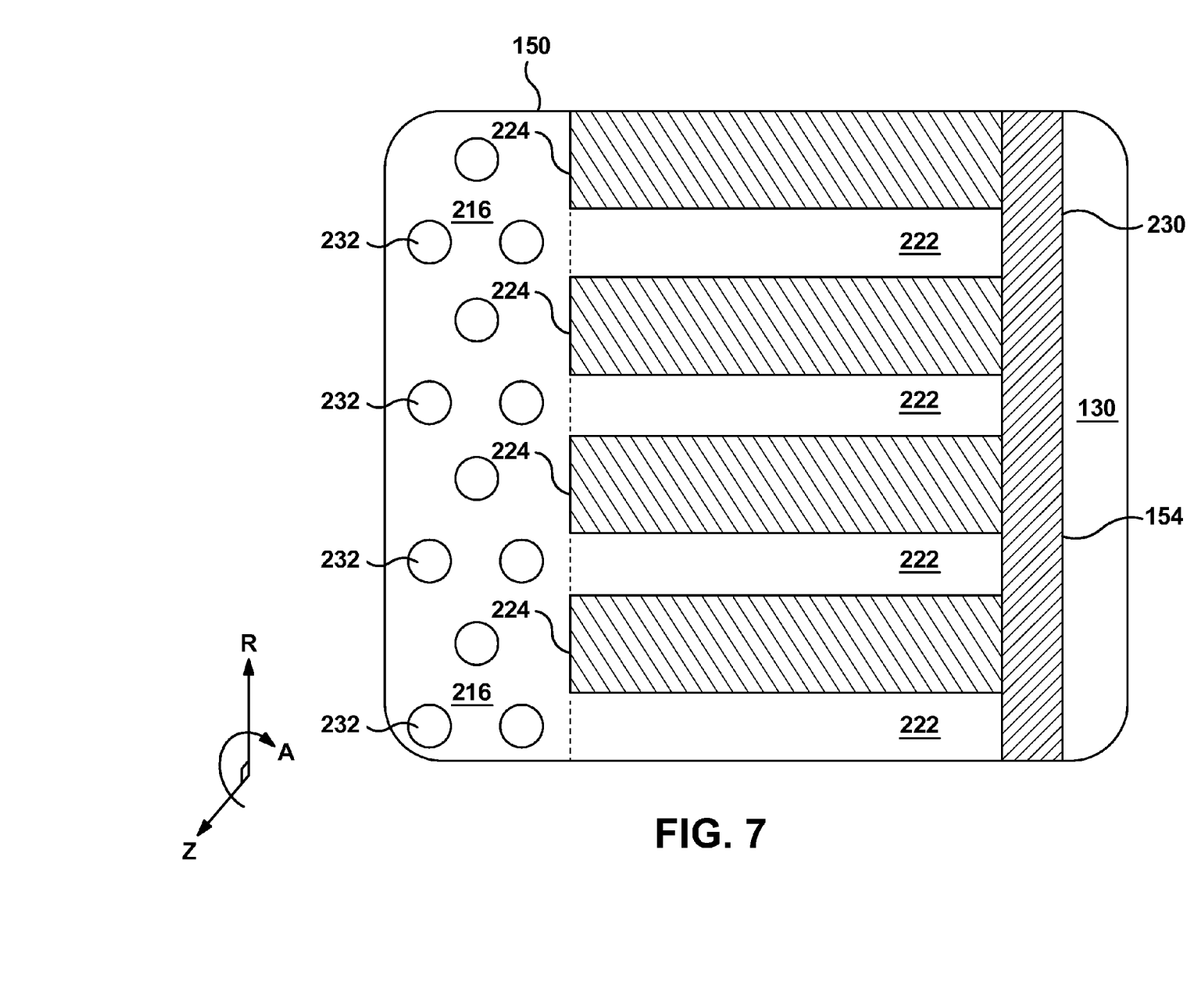
FIG. 7 is a cross-sectional view of an HGP component with a barrier on a tapered edge surface according to embodiments of the present disclosure.

Turning to FIG. 7, a process of fabricating a cooling structure according to the present disclosure can include sealing one or more cooling fluid holes 236 (FIG. 6) along tapered edge 154 to form one or more barriers 230 between flow path 130 for operative fluid and the flow path for cooling fluid within cooling fluid hole 236. The sealed cooling fluid holes can thereby become first passages 222 with barrier(s) 230 positioned at a circumferential end thereof between each first passage 222 and flow path 130. Substantially no fluid communication may be permitted between preliminary cooling zone 216 and flow path 130 through barrier(s) 230 after the forming of barrier(s) 230 and before further process steps are executed. Barrier 230 can be formed according to any currently known or later developed process of forming a barrier against the flow of fluids through a passage. In an example embodiment, where airfoil 150 is composed of a metal substance, barrier 230 can be formed by brazing the surface of tapered edge 154 to form barrier 230 from the brazed, treated metal. In an alternative embodiment, barrier 230 can be formed by applying a pre-sintered perform (PSP) material (e.g., a treated metal, alloy, superalloy, etc.) to cooling fluid hole(s) 236 and tapered edge 154 of airfoil 150.

Figure 8:
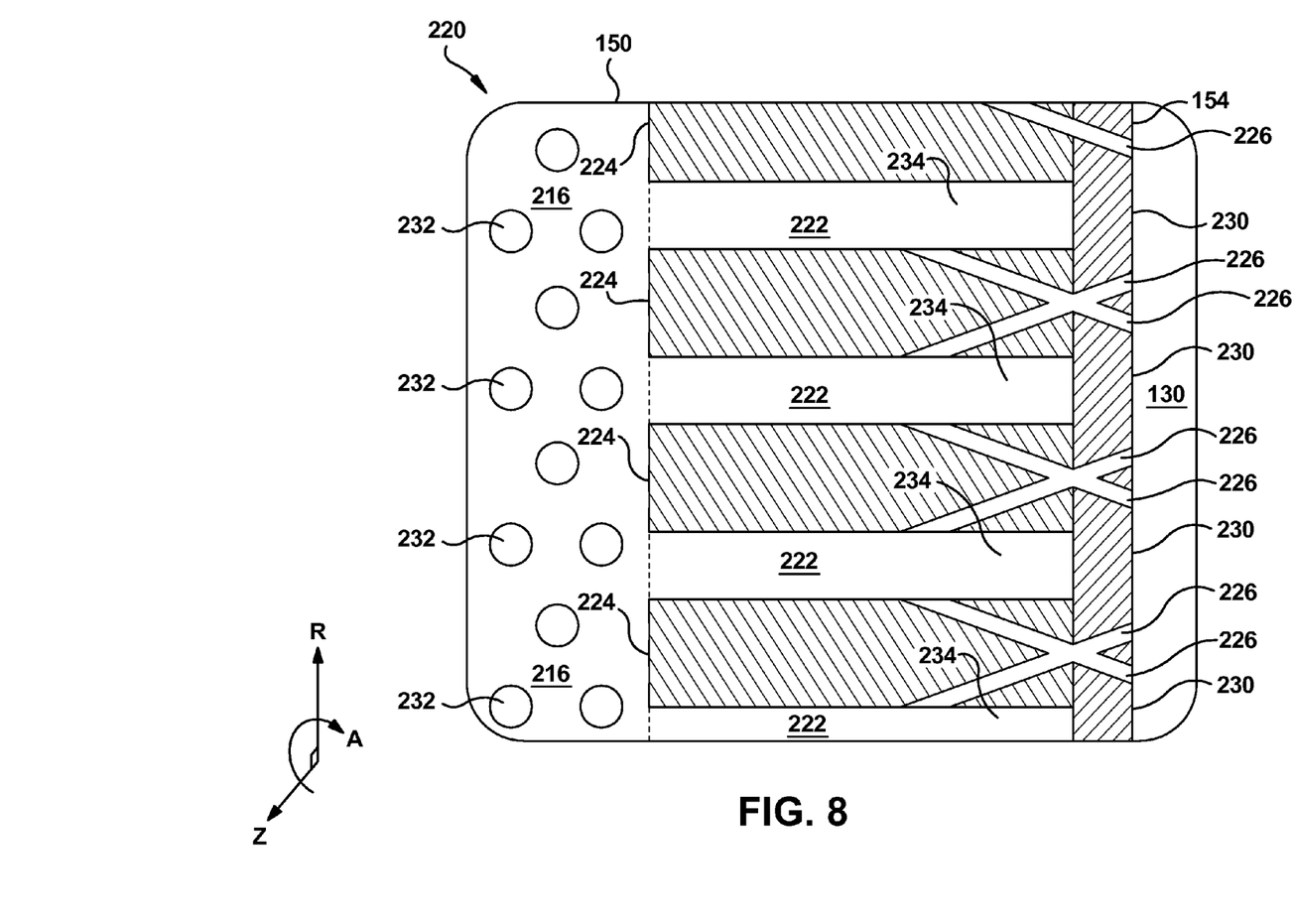
FIG. 8 is a cross-sectional view of a cooling structure fabricated according to methods of the present disclosure.

Referring now to FIG. 8, cooling structure 220 can be fabricated, e.g., by forming one more second passages 226 within tapered edge 154 of airfoil 150. Second passages 226 can be formed pursuant to any currently known or later developed mechanical and/or chemical processing technique for removing portions of a material (e.g., drilling, chemical removal, etc.). In embodiments where barrier 230 is formed on multiple cooling fluid holes 236 (FIG. 6), multiple second passages 226 can be formed by removing portions of barrier 230 and/or airfoil 150. In any event, each second passage 226 can be in fluid communication with one or more first passages 222. The resulting cooling structure 220 can include first and second passages 222, 226 fluidly connecting preliminary cooling zone 216 of airfoil 150 to flow path 130, and external to airfoil 150, in lieu of simple cooling fluid holes 236.

Where multiple second passages 226 are formed, each second passage 226 can extend through the surface of tapered edge 154 in airfoil 150. Each second passage 226 can be positioned at a different location along radial axis R, while extending substantially from first passage(s) 222 to flow path 130, e.g., along circumferential axis A. In addition, an angular orientation of a portion within each first passage 222, e.g., relative to circumferential axis A, can be substantially perpendicular to radial axis R. Second passages 226 can be formed as non-coaxial with first passages 222. The shape of each second passage 226 can also be at least partially non-linear, including sections which run approximately parallel with radial axis R and sections which run approximately perpendicular to radial axis R. Among other things, the fabricated cooling structure 220 can provide for a greater heat transfer coefficient between airfoil 150 and cooling fluids therein at junctions 234 between first and second passages 222, 226, than within preliminary cooling zone 216.

Embodiments of the present disclosure can provide several technical and commercial advantages, some of which are discussed by example herein. For example, first and second passages which meet at a junction or junction passage proximal to the tapered edge of an airfoil can provide for additional cooling of an HGP component in regions which cannot accommodate other types of cooling zones or passages. In particular, this increased cooling can be provided by the junction between the first and second passages where the heat transfer coefficient between the airfoil and cooling fluids therein is greater than within other types of cooling zones. Related technical benefits can include increased cooling of the airfoil in areas with greater sensitivity to increased temperatures during operation. In addition, embodiments of the cooling structures, HGP components, and methods described herein can include a reduced total amount of cooling air needed to cool HGP components in a turbomachine, and greater cooling effectiveness than in cooling structures which provide only film-based or other types of cooling.

The apparatus and method of the present disclosure is not limited to any one particular gas turbine, combustion engine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein. In addition, the various injection systems can be used together, on a single nozzle, or on/with different nozzles in different portions of a single power generation system. Any number of different embodiments can be added or used together where desired, and the embodiments described herein by way of example are not intended to be mutually exclusive of one another.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooling structure comprising:
 a hot gas path (HGP) component configured to be positioned within a flow path of an operative fluid and extending radially from a rotor axis of a turbomachine, the HGP component including a tapered edge;
 a plurality of first passages in direct fluid communication with a preliminary cooling zone of the HGP component, and extending through a sidewall positioned between the preliminary cooling zone and the tapered edge;

a junction positioned at an end of each of the plurality of first passages, the junction being in fluid communication with the preliminary cooling zone through only the plurality of first passages; and a plurality of second passages extending from the junction through at least the tapered edge such that each of the second passages is in direct fluid communication with the flow path, wherein each of the plurality of second passages fluidly connects the junction to the flow path for the operative fluid, wherein the junction is in fluid communication with the flow path for the operative fluid only through the plurality of second passages, and wherein at least one of the plurality of second passages is radially displaced from each passage of the plurality of first passages.

2. The cooling structure of claim 1, wherein each second passage is non-coaxial with each first passage.

3. The cooling structure of claim 1, wherein at least one of the plurality of first passages and at least one of the plurality of second passages is in fluid communication with the preliminary cooling zone and the flow path of the operative fluid.

4. The cooling structure of claim 1, wherein at least one first passage is oriented substantially in parallel with a circumferential axis of the turbomachine, and at least one second passage is oriented substantially at a non-parallel angle relative to the circumferential axis of the turbomachine.

5. The cooling structure of claim 1, further comprising a junction passage positioned between the plurality of first passages and the plurality of second passages, wherein a heat transfer coefficient between the HGP component and the junction passage is greater than a heat transfer coefficient between the HGP component and the preliminary cooling zone.

6. The cooling structure of claim 1, wherein at least one first passage is in fluid communication with at least two second passages.

7. The cooling structure of claim 1, further comprising at least one barrier within at least one first passage and fluidly separating the at least one first passage from the flow path for the operative fluid.

8. An apparatus comprising:
a hot gas path (HGP) component configured to be positioned within a flow path for an operative fluid and extending radially from a rotor axis of a turbomachine, the HGP component including a tapered edge;
an endwall coupled to a radially outer end of the HGP component relative to the rotor axis of the turbomachine;
a plurality of first passages in direct fluid communication with a preliminary cooling zone and extending through a sidewall positioned between the preliminary cooling zone and the tapered edge of the HGP component, wherein the preliminary cooling zone is in fluid communication with a chamber positioned within the endwall;
a junction positioned at an end of each of the plurality of first passages, the junction being in fluid communication with the preliminary cooling zone through only the plurality of first passages; and
a plurality of second passages extending from the junction through at least the tapered edge of the HGP component such that each of the second passages is in direct fluid communication with the flow path, wherein each of the plurality of second passages fluidly connects the junction to the flow path for the operative fluid, wherein the junction is in fluid communication with the flow path for the operative fluid only through the plurality of second passages, and wherein at least one of the plurality of second passages is radially displaced from each passage of the plurality of first passages.

9. The apparatus of claim 8, wherein each second passage is non-coaxial with each first passage.

10. The apparatus of claim 8, wherein at least one of the plurality of first passages and at least one of the plurality of second passages is in fluid communication with the preliminary cooling zone and the flow path of the operative fluid.

11. The apparatus of claim 8, wherein at least one first passage is oriented substantially in parallel with a circumferential axis of the turbomachine, and at least one second passage is oriented substantially at a non-parallel angle relative to the circumferential axis of the turbomachine.

12. The apparatus of claim 8, further comprising a junction passage positioned between the plurality of first passages and the plurality of second passages, wherein a heat transfer coefficient between the HGP component and the junction passage is greater than a heat transfer coefficient between the HGP component and the preliminary cooling zone.

13. The apparatus of claim 8, wherein at least one first passage is in fluid communication with at least two second passages.

14. The apparatus of claim 8, further comprising at least one barrier within at least one first passage and fluidly separating the at least one first passage from the flow path for the operative fluid.

\* \* \* \* \*